United States Patent
Matsuda (10) Patent No.: US 11,215,766 B2
(45) Date of Patent: Jan. 4, 2022

(54) OPTICAL FIBER CONNECTION DEVICE FOR CONNECTING OPTICAL FIBER AND OPTICAL FIBER ASSEMBLY

(71) Applicant: FANUC CORPORATION, Yamanashi (JP)

(72) Inventor: Munekazu Matsuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/023,548

(22) Filed: Sep. 17, 2020

(65) Prior Publication Data

US 2021/0003790 A1    Jan. 7, 2021

Related U.S. Application Data

(62) Division of application No. 16/548,911, filed on Aug. 23, 2019, now abandoned.

(30) Foreign Application Priority Data

Aug. 27, 2018 (JP) .............................. JP2018-158176

(51) Int. Cl.
*G02B 6/38* (2006.01)
*G02B 6/36* (2006.01)
(Continued)

(52) U.S. Cl.
CPC ........... *G02B 6/3849* (2013.01); *G02B 6/325* (2013.01); *G02B 6/3847* (2013.01);
(Continued)

(58) Field of Classification Search
None
See application file for complete search history.

(56) References Cited

U.S. PATENT DOCUMENTS 5,704,802 A  *  1/1998  Loudermilk ......... H01R 13/717
                                                                      439/490
6,499,861 B1 * 12/2002  German ............... H01R 13/717
                                                                      362/234
(Continued)

FOREIGN PATENT DOCUMENTS

CN         20546851 U      8/2016
EP          2084797 B1 *  5/2018  ......... G06K 19/0723
(Continued)

OTHER PUBLICATIONS

English Abstract and Machine Translation for Japanese Publication No. JP 2015-043048 A, published Mar. 5, 2015, 26 pgs.
(Continued)

*Primary Examiner* — Michelle R Connelly
(74) *Attorney, Agent, or Firm* — Fredrikson & Byron, P.A.

(57) ABSTRACT

An optical connection device includes an optical fiber, a first connection member which includes an inlet to which the optical fiber is connected and an outlet, a second connection member which includes an aperture connected to the outlet of the first connection member and to which light from the optical fiber is transmitted through the first connection member, and a first light transmission protection part which protects a tip of the optical fiber in the first connection member.

7 Claims, 10 Drawing Sheets

(51) Int. Cl.
*G02B 6/42* (2006.01)
*G02B 6/32* (2006.01)

(52) U.S. Cl.
CPC ......... *G02B 6/3895* (2013.01); *G02B 6/3897* (2013.01); *G02B 6/3624* (2013.01); *G02B 2006/4297* (2013.01)

(56) References Cited

U.S. PATENT DOCUMENTS

| | | | | |
|---|---|---|---|---|
| 6,971,895 | B2 * | 12/2005 | Sago | G02B 6/3895 439/188 |
| 7,226,218 | B2 * | 6/2007 | Wang | G02B 6/4206 372/36 |
| 8,571,376 | B2 * | 10/2013 | Cook | G02B 6/3849 385/135 |
| 9,052,488 | B2 * | 6/2015 | Cook | G02B 6/4494 |
| 9,058,529 | B2 * | 6/2015 | Renfro, Jr. | G02B 6/4246 |
| 9,568,687 | B2 * | 2/2017 | Sato | G02B 6/3849 |
| 10,359,578 | B2 * | 7/2019 | Takeuchi | G02B 6/385 |
| 10,473,864 | B2 * | 11/2019 | Anderson | G02B 6/3895 |
| 10,768,375 | B2 * | 9/2020 | Leigh | G02B 6/383 |
| 10,845,548 | B2 * | 11/2020 | Takeuchi | G02B 6/3895 |
| 2005/0013542 | A1 | 1/2005 | Blasingame | |
| 2007/0003206 | A1 | 1/2007 | Dunphy et al. | |
| 2008/0100467 | A1 * | 5/2008 | Downie | G02B 6/3895 340/686.2 |
| 2011/0221601 | A1 | 9/2011 | Aguren | |
| 2012/0274452 | A1 * | 11/2012 | Chamarti | G02B 6/3895 340/10.5 |
| 2014/0188096 | A1 * | 7/2014 | Chia | G02B 6/3812 606/16 |
| 2017/0365973 | A1 * | 12/2017 | Holleman | H01S 3/094053 |

FOREIGN PATENT DOCUMENTS

| | | | |
|---|---|---|---|
| JP | S56062214 | A | 5/1981 |
| JP | S61121013 | A | 6/1986 |
| JP | S62027704 | A | 2/1987 |
| JP | S63304212 | A | 12/1988 |
| JP | H01122689 | A | 5/1989 |
| JP | H06342114 | A | 12/1994 |
| JP | H07333454 | A | 12/1995 |
| JP | 2002174750 | A | 6/2002 |
| JP | 2006054366 | A | 2/2006 |
| JP | 2007334015 | A | 12/2007 |
| JP | 20093137 | A | 1/2009 |
| JP | 2012143414 | A | 8/2012 |
| JP | 2015043048 | A | 3/2015 |
| JP | 2015120183 | A | 7/2015 |
| JP | 2016010497 | A | 1/2016 |

OTHER PUBLICATIONS

English Abstract and Machine Translation for Japanese Publication No. JP 2016-010497 A, published Jan. 21, 2016, 34 pgs.
English Machine Translation for Japanese Publication No. JPS56-062214 A, published May 28, 1981, 4 pgs.
English Abstract and Machine Translation for Japanese Publication No. JPS63-304212 A, published Dec. 12, 1988, 7 pgs.
English Abstract and Machine Translation for Japanese Publication No. JPH01-122689 A, published May 15, 1989, 6 pgs.
English Abstract and Machine Translation for Japanese Publication No. JPH06-342114 A, published Dec. 13, 1994, 14 pgs.
English Abstract and Machine Translation for Japanese Publication No. JPH07-333454 A, published Dec. 22, 1995, 17 pgs.
English Abstract and Machine Translation for Japanese Publication No. JP 2002-174750 A, published Jun. 21, 2002, 38 pgs.
English Abstract and Machine Translation for Japanese Publication No. JP 2012-143414 A, published Aug. 2, 2012, 42 pgs.
English Abstract for Chinese Publication No. CN 20546851 U, published Aug. 17, 2016, 1 pg.
English Abstract and Machine Translation for Japanese Publication No. JP 2015-120183 A, published Jul. 2, 2015, 30 pgs.
Hagiwara, machine translation of JPS 62-027704 A, Feb. 5, 1987 (Year: 1987).
English Abstract for Japanese Publication No. 2006-054366 A, published Feb. 23, 2006, 2 pgs.
English Abstract and Machine Translation for Japanese Publication No. JP 2009-003137 A, published Jan. 8, 2009, 27 pgs.
English Abstract and Machine Translation for Japanese Publication No. JP 2007-334015 A, published Dec. 27, 2007, 15 pgs.
English Abstract and Machine Translation for Japanese Publication No. JPS 61-121013 A, published Jun. 9, 1986, 14 pgs.

* cited by examiner

OPTICAL FIBER CONNECTION DEVICE FOR CONNECTING OPTICAL FIBER AND OPTICAL FIBER ASSEMBLY

RELATED APPLICATIONS

This is a divisional application of U.S. application Ser. No. 16/548,911, filed Aug. 23, 2019, which claims priority to Japanese Application No. 2018-158176, filed Aug. 27, 2018, the contents of which are hereby incorporated by reference herein.

BACKGROUND OF THE INVENTION

1. Field of the Invention

The present invention relates to an optical fiber connection device for connecting an optical fiber and an optical fiber assembly.

2. Description of Related Art

Optical fibers are used to transmit laser light to, for example, a Galvano scanner head or a laser machining head. When the Galvano scanner head, etc., is changed, the optical fiber is removed from the head and subsequently attached to another head (refer to, for example, Japanese Unexamined Patent Publication (Kokai) No. 2015-120183).

SUMMARY OF THE INVENTION

Galvano scanner heads and laser machining heads (hereinafter sometimes referred to simply as "head") may be used in environments in which foreign matter such as dust and humidity are prevalent. Thus, when the optical fiber is removed, there is a problem in that the foreign matter adheres to the laser emission surface (tip surface) of the optical fiber. The laser emission surface has a very high laser light power density (up to approximately 10 kW/mm$^2$), and the laser light is absorbed by the minute foreign matter, whereby breakage of the optical fiber may occur. When attaching an optical fiber to a head, it is necessary to wear clean room gloves and to use a clean booth in order to prevent foreign matter from adhering to the laser emission surface.

Thus, installation in which the tip of the optical fiber is not exposed to the air has been demanded.

According to a first aspect of the present disclosure, there is provided an optical fiber connection device, comprising an optical fiber, a first connection member which includes an inlet and an outlet and in which the optical fiber is connected to the inlet, a second connection member which includes an aperture connected to the outlet of the first connection member and to which light from the optical fiber is transmitted through the first connection member, and a first light transmission protection part which protects a tip of the optical fiber in the first connection member.

In the first aspect, installation can be performed without exposing the tip of the optical fiber to the air. Thus, the adhesion of foreign matter to the tip surface of the optical fiber can be prevented. Furthermore, it is not necessary to use clean room gloves or a clean booth, whereby operational efficiency is improved.

The objects, features, and advantages of the present invention will become more apparent from the following descriptions of the embodiments in conjunction with the accompanying drawings.

DETAILED DESCRIPTION

The embodiments of the present invention will be described below with reference to the attached drawings. Throughout the drawings, corresponding constituent elements have been assigned the same reference numerals.

Figure 1A:
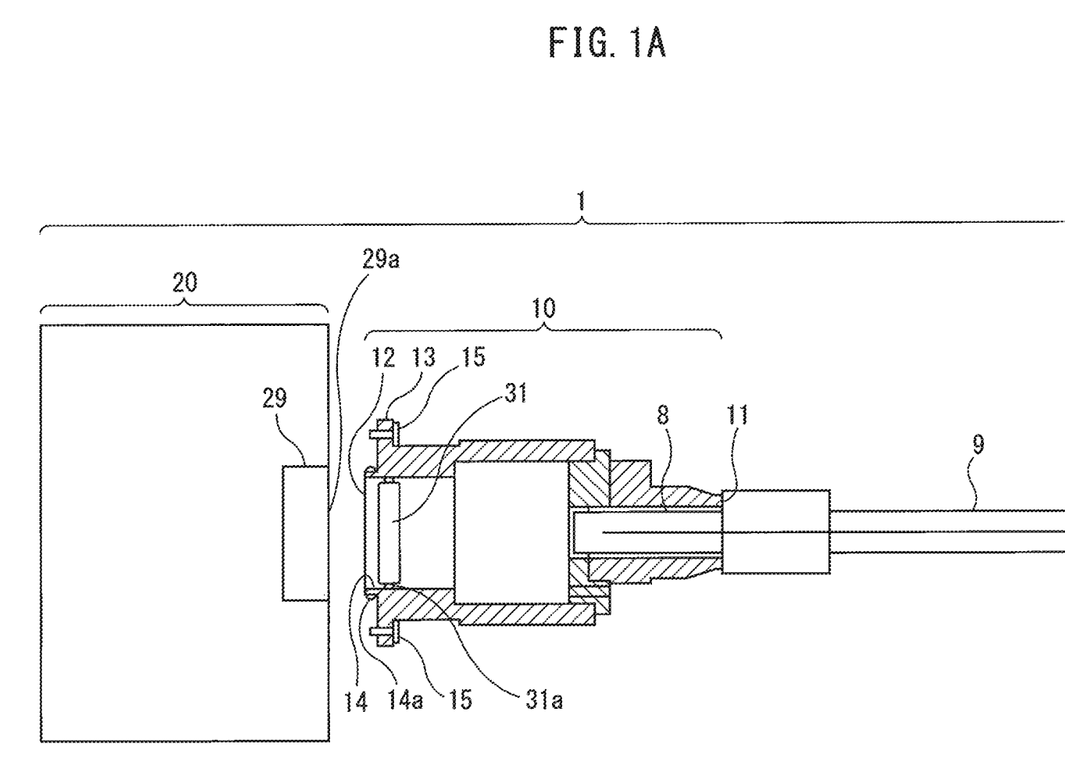
FIG. 1A is a longitudinal sectional view of an optical fiber connection device based on a first embodiment.
Figure 1B:
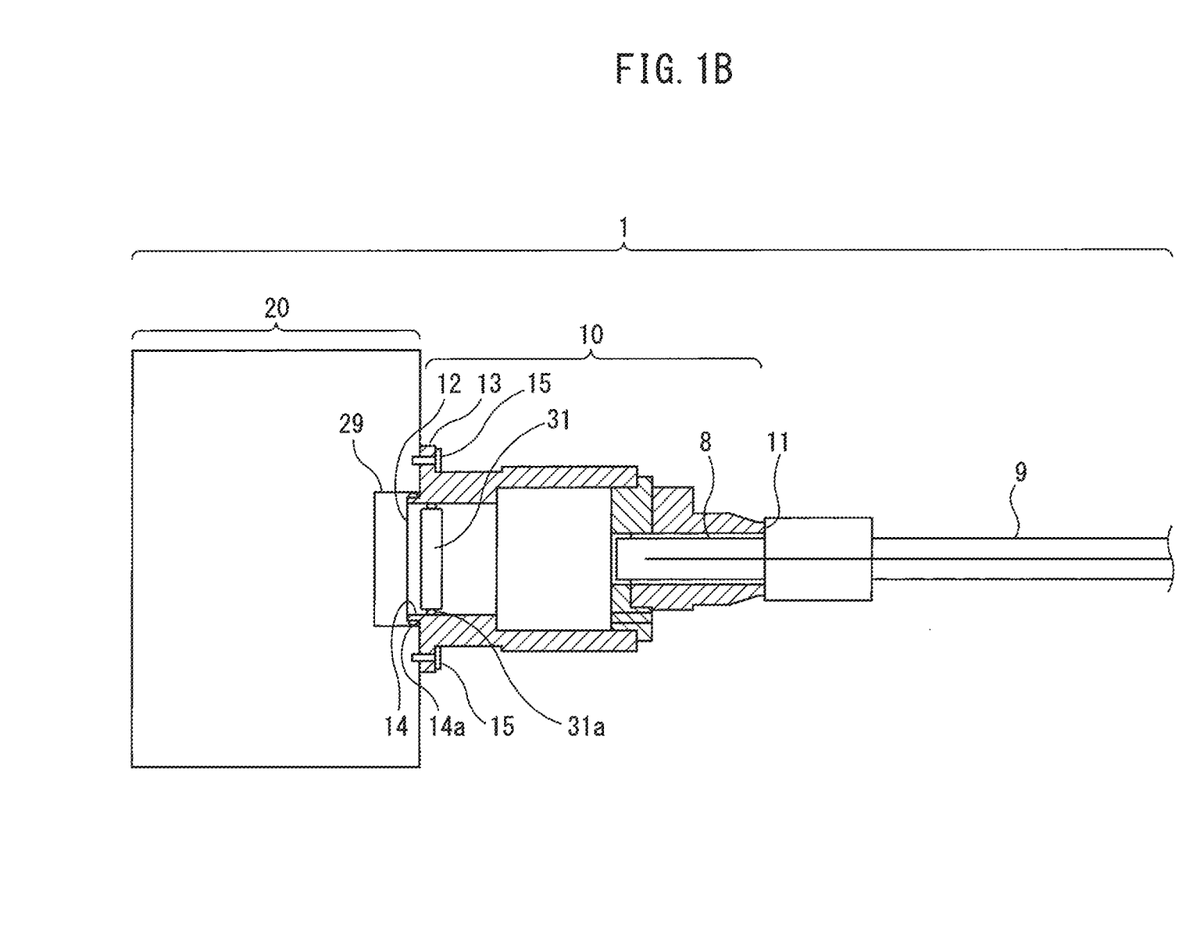
FIG. 1B is a longitudinal sectional view of the optical fiber connection device based on the first embodiment.

FIGS. 1A and 1B are longitudinal sectional views of the optical fiber connection device based on the first embodiment. The optical fiber connection device 1 depicted in these drawings is primarily composed of a first connection member 10 and a second connection member 20.

The first connection member 10 is an adapter which includes an inlet 11 and an outlet 12 and which has a hollow structure. A cover member 8 which covers an optical fiber 9 in the circumferential direction is attached to the tip of the optical fiber 9. The cover member 8 is connected to the inlet 11 of the first connection member 10 by, for example, snap-fitting. The tip of the optical fiber 9 terminates inside the cover member 8. Note that the tip of the optical fiber 9 may be directly connected to the inlet 11 of the first connection member 10.

The outlet 12 side of the first connection member 10 projects as an extension 14. A seal member 14a is attached to the outer circumferential surface of the extension 14. Further, a flange 13 is provided on the proximal side of the extension 14. A fixation member 15, which will be described later, is arranged on the flange 13.

As shown in FIGS. 1A and 1B, a first light transmission protection part 31 which protects the tip of the optical fiber is arranged in the pathway between the inlet 11 and the outlet 12 of the first connection member 10. The first light transmission protection part 31 is made of, for example, glass, but may be formed from another optically transparent material. The first light transmission protection part 31 has a shape which corresponds to the pathway described above, and a seal member 31a is attached to the outer circumferential surface of the first light transmission protection part 31. Thus, the area between the first light transmission protection part 31 and the tip of the optical fiber 9 is sealed. Note that the first light transmission protection part 31 may be attached to the cover member 8 via the seal member 31a.

Furthermore, the second connection member 20 is a to-be-connected member to which the first connection member 10 is connected, such as a Galvano scanner head or a laser machining head. Note that the second connection member 20 may be another member or component. A recess 29 having an aperture 29a is formed on one surface of the second connection member 20. The recess 29 has a shape corresponding to the extension 14. Furthermore, though not illustrated in the drawings, a receiving part for receiving light from the optical fiber 9 is arranged on the left side of the recess 29.

When the first connection member 10, to which the optical fiber 9 has been attached via the cover member 8, is connected to the second connection member 20, as shown in FIG. 1B, the extension 14 of the first connection member 10 is inserted into the aperture 29a of the recess 29 of the second connection member 20. The flange 13 of the first connection member 10 is pressed against a surface of the second connection member 20. Then, the first connection member 10 is affixed to the surface of the second connection member 20 using the fixation members 15, such as screws. As a result, the first connection member 10 and the second connection member 20 can be simply and reliably connected to each other. It can be understood that even when one or both of the extension 14 of the first connection member 10 and the recess 29 of the connection member 20 are not provided, the first connection member 10 can be similarly affixed to the second connection member 20 using the fixation members 15.

As described above, the seal member 31a is arranged on the first light transmission protection part 31. Thus, in the present embodiment, installation can be performed without exposing the tip of the optical fiber 9 to the air, whereby the adhesion of foreign matter to the tip surface of the optical fiber 9 can be prevented. Furthermore, it is not necessary to use clean room gloves or a clean booth, whereby operational efficiency is improved.

Figure 2A:
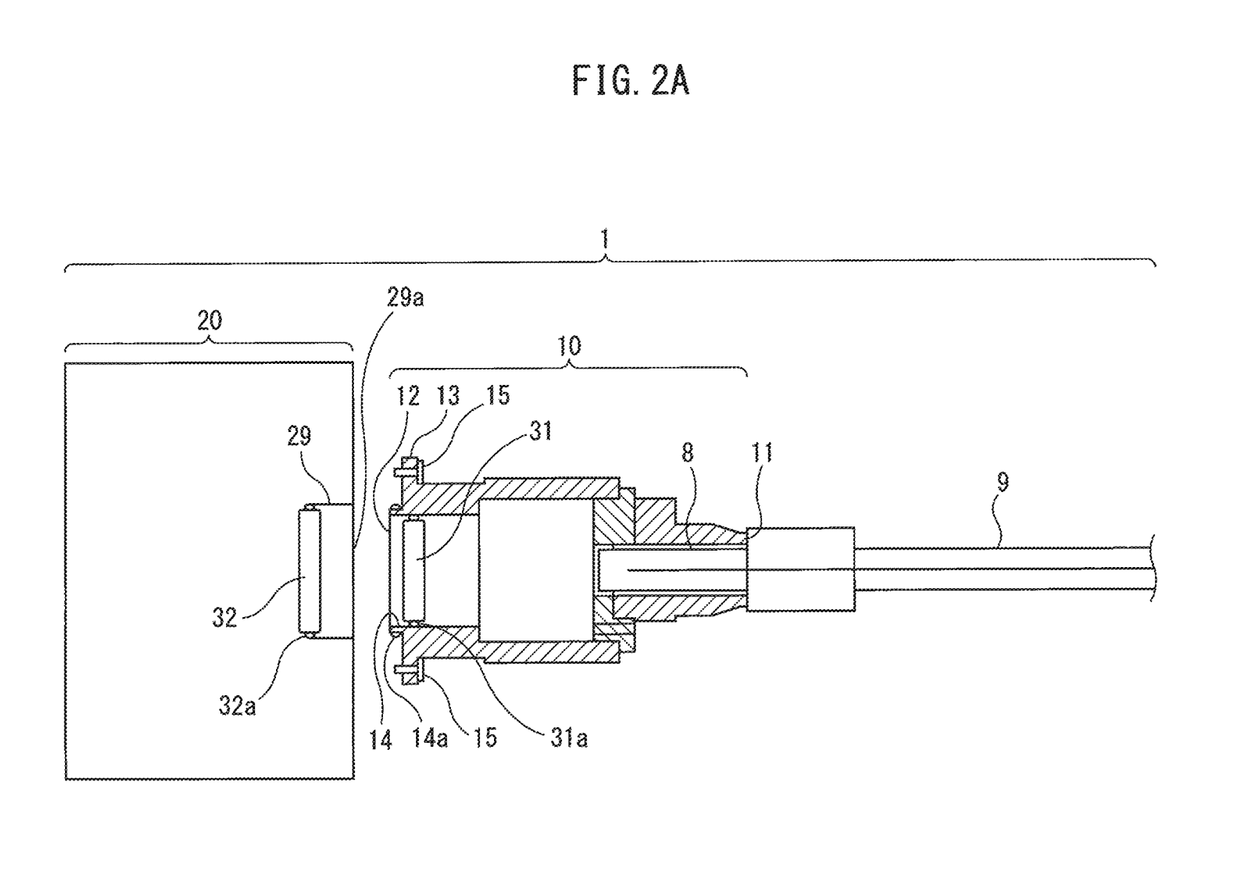
FIG. 2A is a longitudinal sectional view of an optical fiber connection device based on a second embodiment.
Figure 2B:
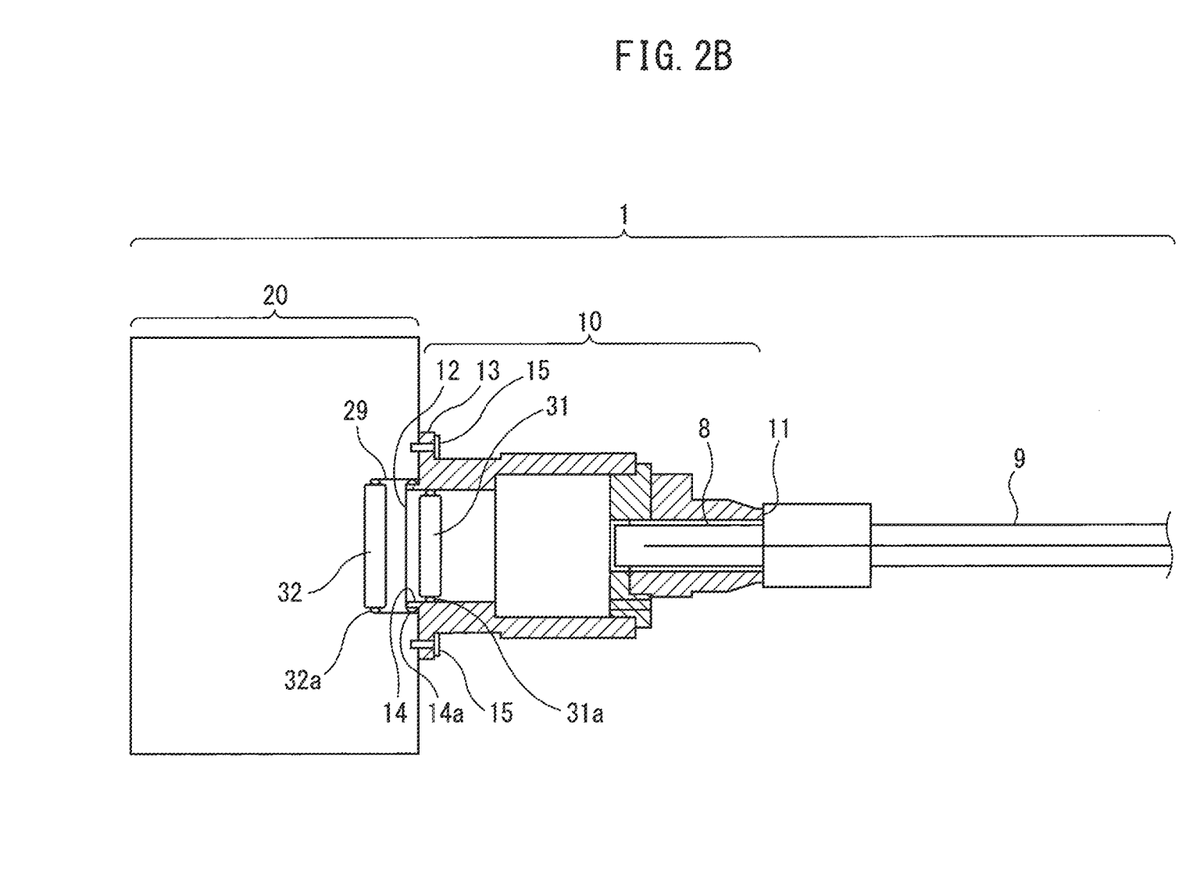
FIG. 2B is a longitudinal sectional view of the optical fiber connection device according to the second embodiment.

FIGS. 2A and 2B are longitudinal sectional views of an optical fiber connection device based on a second embodiment. In the second embodiment, a second light transmission protection part 32, which is similar to the first light transmission protection part 31, is arranged on the inner circumferential surface of the recess 29 of the second connection member 20 via a seal member 32a. In this case, in addition to the effects described above, the entry of air into the interior of the second connection member 20 can be prevented. Note that even if the recess 29 is not formed and the second light transmission protection part 32 is arranged in an aperture (not illustrated) formed in the wall of the second connection member 20, the same effects can be obtained.

Figure 3A:
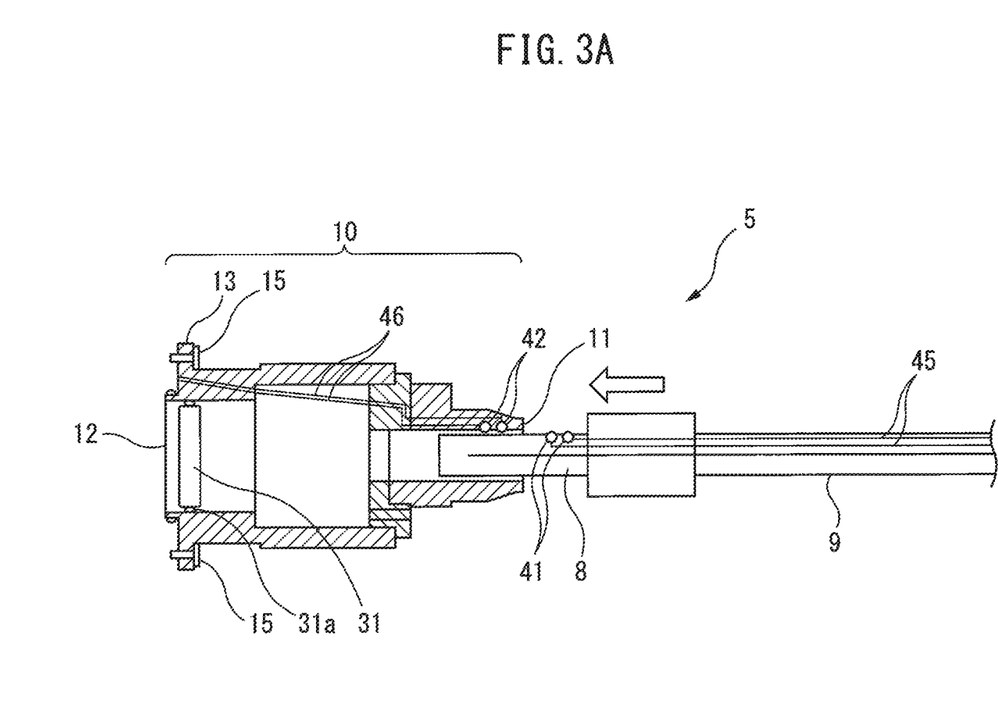
FIG. 3A is a longitudinal sectional view of a first connection member of an optical fiber connection device based on a third embodiment.
Figure 3B:
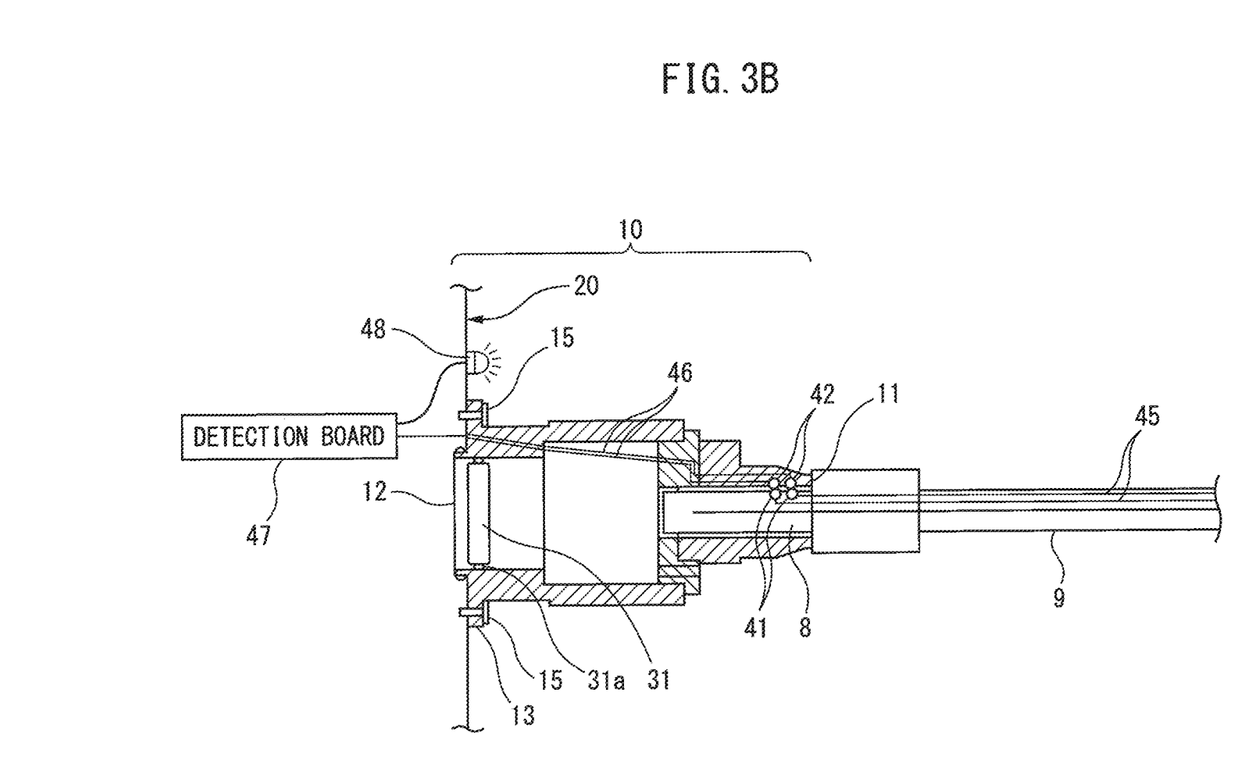
FIG. 3B is a longitudinal sectional view of the optical fiber connection device based on the third embodiment.

FIG. 3A is a longitudinal sectional view of the first connection member of an optical fiber connection device based on a third embodiment, and FIG. 3B is a longitudinal sectional view of the optical fiber connection device based on the third embodiment. In these drawings, contacts, for example, two spring contacts 41, are arranged on the outer circumferential surface of the cover member 8 next to each other in the axial direction. Signal lines 45 extend from the respective spring contacts 41 and are connected to, for example, a controller (not illustrated) or a laser oscillator (not illustrated).

Further, contacts, for example, two spring contacts 42, are provided on the inner circumferential surface of the first connection member 10 in positions corresponding to the spring contacts 41. Signal lines 46 extend from the respective spring contacts 42 and terminate at the distal surface of the flange 13.

When the cover member 8, which is connected to the optical fiber 9, is inserted a predetermined distance into the inlet 11 of the first connection member 10, as shown in FIG. 3B, the cover member 8 engages with the interior of the first connection member 10 by, for example, snap-fitting. Simultaneously, at least one of the spring contacts 41 and the spring contacts 42 are pressed toward the interior and contact each other. As a result, the two signal lines 45 are electrically connected through the spring contacts 41, 42. Thus, when energized, it can be determined that the cover member 8 and the first connection member 10 have been correctly connected. Therefore, the spring contacts 41, 42 and the signal lines 45 can serve as a connection state detection part which detects a state of connection between the cover member 8, which is provided with the optical fiber 9, and the first connection member 10.

Further, the first connection member 10 is affixed to the second connection member 20 by the fixation members 15, as shown in FIG. 3B. Since the surface of the second connection member 20 is made of metal, the signal lines 45, 46 are electrically connected through the spring contacts 41, 42 and the surface of the second connection member 20. Thus, when energized, it can be determined that the cover member 8 and the first connection member 10 have been correctly connected and that the first connection member 10 and the second connection member 20 have been correctly connected. Therefore, the spring contacts 41, 42 and signal lines 45, 46 serve as a connection state detection part which detects the state of connection between the first connection member 10 and the second connection member 20 and the state of connection between the optical fiber 9 and the first connection member 10.

Further, as shown in FIG. 3B, the signal lines 46, which are electrically connected to the surface of the second connection member 20, may be connected to a detection board 47. A notification part 48, such as a light emitting element, which issues a notification regarding the state of connection between the first connection member 10 and the second connection member 20, may be provided on the second connection member 20. Thus, when the first connection member 10 and the second connection member 20 are correctly connected, the notification part 48, such as the light emitting element, illuminates. As a result, a user can easily confirm the state of connection between the first connection member 10 and the second connection member 20. When the notification part, such as the light emitting element, does not illuminate, the first connection member 10 and the second connection member 20 are not correctly connected. In this case, the user may reconnect the first connection member and the second connection member.

Figure 4:
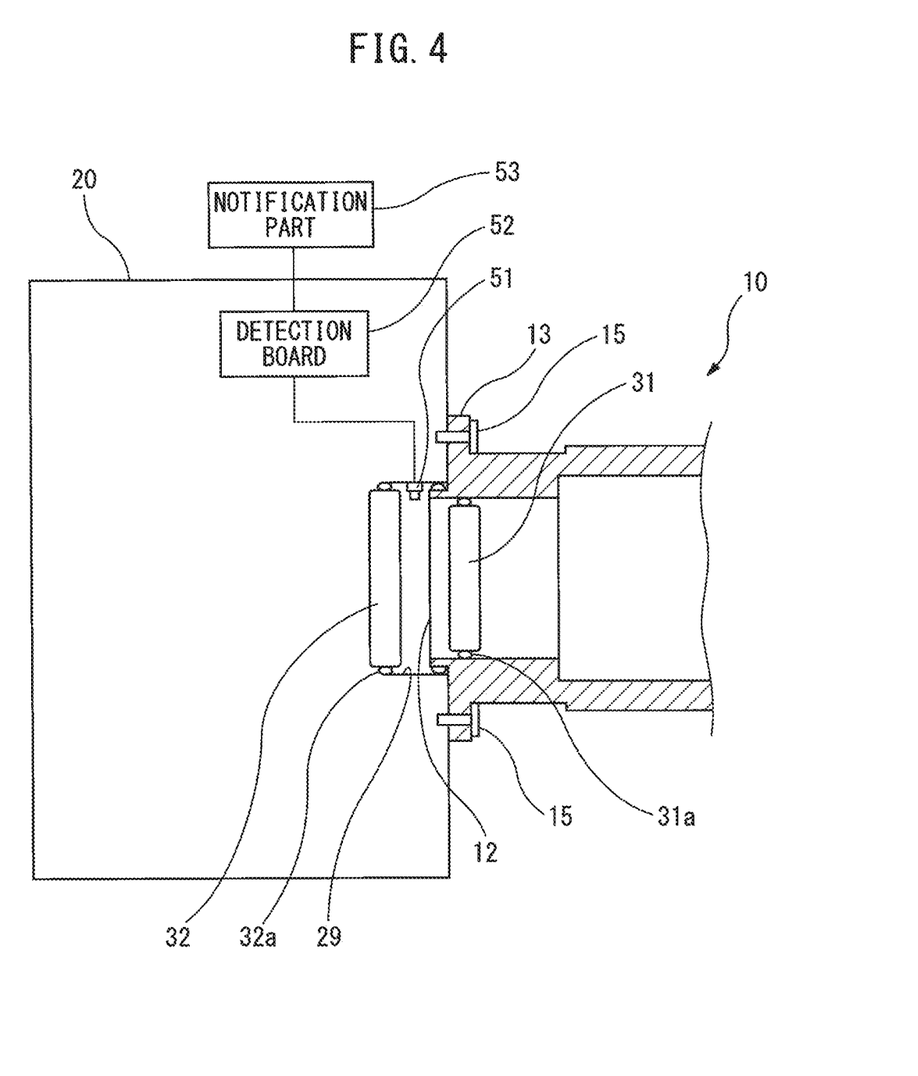
FIG. 4 is a partial cross-sectional view of an optical fiber connection device based on a fourth embodiment.

FIG. 4 is a partial cross-sectional view of an optical fiber connection device based on a fourth embodiment. In FIG. 4, the first connection member 10 is affixed in a state in which the extension 14 thereof is inserted into to the recess 29 of the second connection member 20. In the fourth embodiment, a contamination degree detection part 51 is arranged on the inner circumferential surface of the recess 29. The contamination degree detection part 51 is arranged in the space surrounded by the first light transmission protection part 31 and the second light transmission protection part 32. The contamination degree detection part 51 is, for example, a photo diode which detects a degree of contamination due to foreign matter adhered to the surfaces of the first light transmission protection part 31 and the second light transmission protection part 32 as well as foreign matter, such as dust and humidity, in the space. Alternatively, since foreign matter increases light scattering, which causes an increase in temperature, the contamination degree detection part 51 may be a thermistor or thermocouple.

When foreign matter as described above is present in the space surrounded by the first light transmission protection part 31 and the second light transmission protection part 32, the light transmission protection parts 31, 32 may become contaminated or damaged. In the present embodiment, when the degree of contamination detected by the contamination degree detection part 51 exceeds a predetermined threshold value, a notification part 53 issues a notification through a detection board 52. The notification part 53 may be a light emitting element or a display. As a result, the degree of contamination of the surfaces of the first light transmission protection part 31 and the second light protection part 32 and the degree of contamination of the space surrounded by the first light transmission protection part 31 and the second light transmission protection part 32 can be easily confirmed, and the user can be notified regarding the degrees of contamination.

Figure 5:
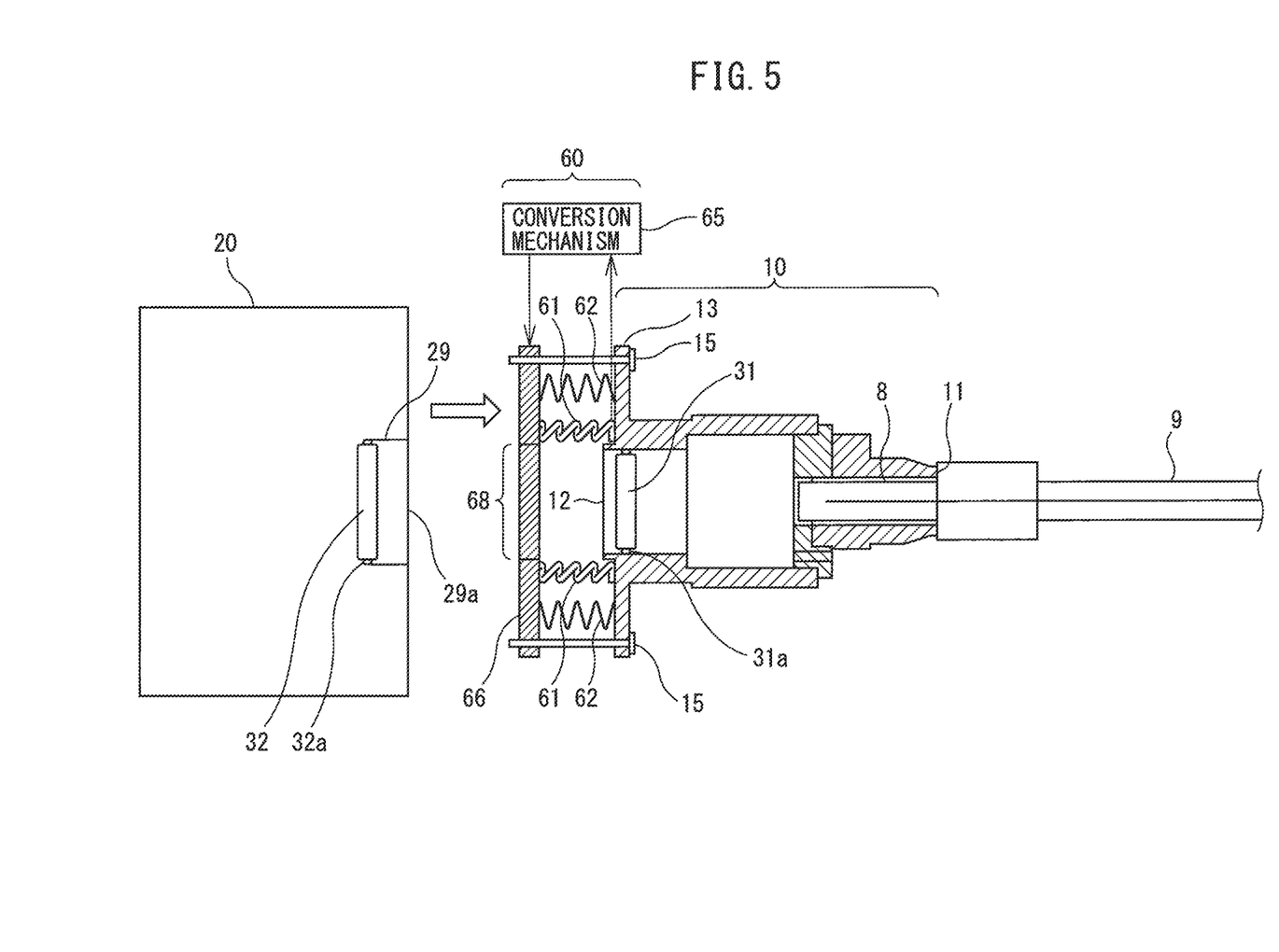
FIG. 5 is a longitudinal sectional view of an optical fiber connection device based on a fifth embodiment.

Further, FIG. 5 is a longitudinal sectional view of an optical fiber connection device based on a fifth embodiment. In FIG. 5, an openable lid 60 is provided on the outlet 12 side of the first connection member 10. The lid 60 primarily comprises an openable diaphragm 68, a support body 66 which supports the diaphragm 68, and an elastic body 61, such as a spring, which connects the support body 66 and the first connection member 10.

A bellows 62 is arranged around the elastic body 61 between the support member 66 and the first connection member 10. Thus, the space surrounded by the support body 66, the first connection member 10, and the bellows 62 is sealed. Since the diaphragm 68 of the lid 60 is closed when the first connection member 10 has been removed, the outer surface of the first light transmission protection part 31 is protected by the lid 60. When the first connection member 10 is connected to the second connection member 20, the support body 66 abuts one surface of the second connection member 20, and the elastic body 61 is pressed and contracted. The pressing force imparted to the elastic body 61 is converted by a conversion mechanism 65 into a force that opens the diaphragm 68.

Figure 6A:
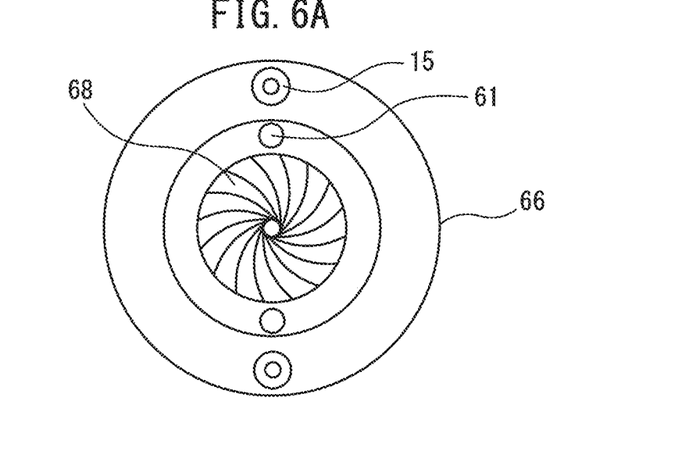
FIG. 6A is a first end view of a lid.
Figure 6B:
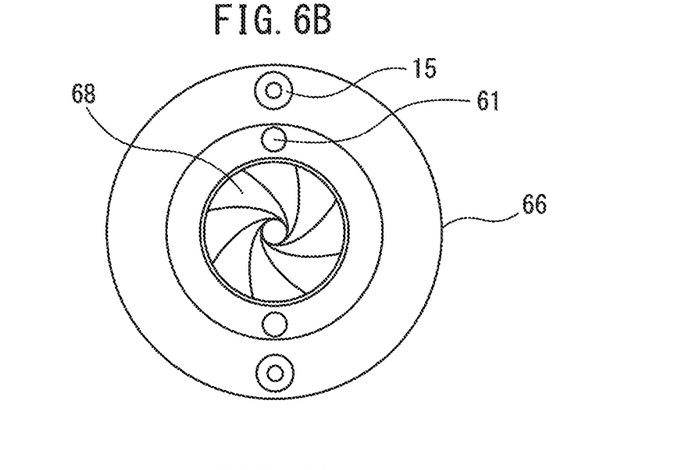
FIG. 6B is a second end view of the lid.
Figure 6C:
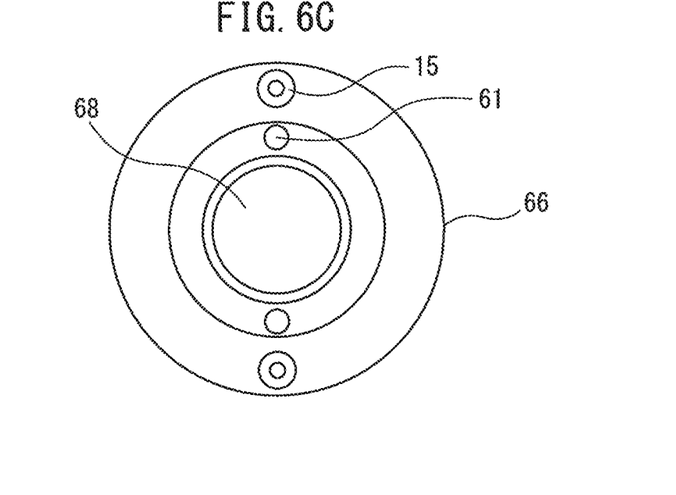
FIG. 6C is a third end view of the lid.

As shown in FIGS. 6A to 6C, which are end views of the lid, when the elastic body 61 is pressed, the diaphragm 68 gradually opens. When the elastic body 61 is pressed to a predetermined degree, the diaphragm 68 is fully opened, as shown in FIG. 6C. In this state, the first connection member 10 can be affixed by the user to the second connection member 20 as described above using the fixation members 15, which are attached to the support body 66.

Thus, in the present embodiment, installation and removal of the first connection member 10 can be performed without exposing the first light transmission protection part 31 to the air. In other words, contamination of the outer surface of the first light transmission protection part 31 can be prevented when attaching and removing the first connection member 10. Note that a lid having another configuration which can be opened by pressing the first connection member 10 against the second connection member 20 is encompassed by the scope of the present disclosure. A similar lid 60 may be provided on the second light transmission protection part 32 of the second connection member 20.

Referring again to FIG. 3A, the first connection member 10 to which the optical fiber 9 has been connected is shown. Such a first connection member 10 having the optical fiber 9 connected thereto can be used, distributed, sold, etc., as an optical fiber assembly 5. In this case, the first connection member 10 may be simply referred to as a connection member 10. Further, it is obvious that some of the embodiments of the optical fiber connection device 1 described above can be equivalently applied to the optical fiber assembly 5.

Figure 7:
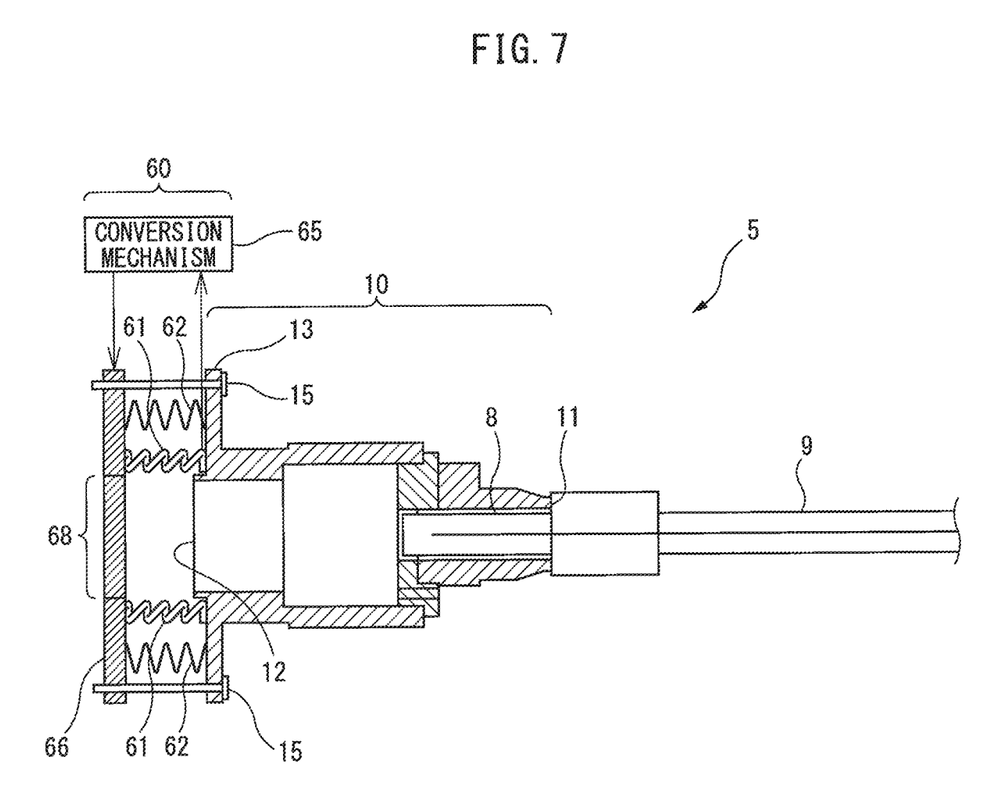
FIG. 7 is a longitudinal sectional view of an optical fiber assembly based on a sixth embodiment.

FIG. 7 is a longitudinal sectional view of an optical fiber assembly according to a seventh embodiment. The optical fiber assembly 5 shown in FIG. 7 has substantially the similar structure as the structure shown in FIG. 5. However, the optical fiber assembly 5 shown in FIG. 7 does not include a first light transmission protection part 31. In this case, when the lid 60 is closed, the lid 60 serves as the first light transmission protection part 31. As a matter of course, though the lid 60 does not transmit light, the lid 60 prevents the tip of the optical fiber 9 from being exposed to the air. Thus, it is obvious that the similar effects as described above can be obtained in this case as well.

Aspects of the Disclosure

According to a first aspect, there is provided an optical fiber connection device (1), comprising an optical fiber (9), a first connection member (10) which includes an inlet (11) and an outlet (12) and in which the optical fiber is connected to the inlet, a second connection member (20) which includes an aperture (29a) connected to the outlet of the first connection member and to which light from the optical fiber is transmitted through the first connection member, and a first light transmission protection part (31) which protects a tip of the optical fiber in the first connection member.

According to a second aspect, in the first aspect, a second light transmission protection part (32) which protects the aperture of the second connection member is further provided.

According to a third aspect, in the first or second aspect, a fixation member (15) which affixes the outlet of the first connection member and the second connection member is provided.

According to a fourth aspect, in any of the first to third aspects, a seal member (14a) which is arranged between the first connection member and the second connection member is provided.

According to a fifth aspect, in any of the first to fourth aspects, a connection state detection part which detects a state of connection between the first connection member and the second connection member is provided.

According to a sixth aspect, in the fifth aspect, the connection state detection part further detects a state of connection between the optical fiber and the first connection member.

According to a seventh aspect, in the fifth or sixth aspect, a notification part (53) which issues a notification regarding a state of connection between the first connection member and the second connection member is provided.

According to an eighth aspect, in the second aspect, a contamination degree detection part (51) which detects a degree of contamination of a space between the first light transmission protection part and the second light transmission protection part is provided.

According to a ninth aspect, in any of the first through eighth aspects, an openable lid (60) which is provided on at least one of the outlet of the first connection member and the aperture of the second connection member is provided.

According to a tenth aspect, there is provided an optical fiber assembly (5), comprising an optical fiber (9), a first connection member (10) which includes an inlet (11) and an outlet (12), wherein the optical fiber is connected to the inlet, and a light transmission protection part (31) which protects a tip of the optical fiber in the connection member.

According to an eleventh aspect, in the tenth aspect, an openable lid (60) is provided on the outlet of the first connection member.

According to a twelfth aspect, there is provided an optical fiber assembly (5), comprising an optical fiber (9), a connection member (10) which includes an inlet (11) and an outlet (12), wherein the optical fiber is connected to the outlet, and an openable lid (60) which is provided on the outlet of the connection member.

Effects of the Aspects

In the first, tenth, and twelfth aspects, installation can be performed without exposing the tip of the optical fiber to the air.

In the second aspect, the entry of air into the interior of the second connection member can be prevented. Note that the second connection member is a Galvano scanner head or a laser machining head.

In the third aspect, the first connection member and the second connection member can be simply and reliably connected to each other.

In the fourth aspect, the entry of air into the space between the first connection member and the second connection member can be prevented.

In the fifth aspect, correct connection between the optical fiber and the first connection member can be detected.

In the sixth aspect, correct connection between the first connection member and the second connection member can be detected.

In the seventh aspect, the state of connection between the first connection member and the second connection member can be easily confirmed. When the state of connection between the first connection member and the second connection member is incomplete, a user may reconnect the first connection member and the second connection member.

In the eighth aspect, the degree of contamination of the space between the first light transmission protection part and the second light transmission protection part can be easily confirmed.

In the ninth and eleventh aspects, exposure of the first light transmission protection part to the air can be prevented.

Though the embodiments of the present invention have been described above, a person skilled in the art would understand that various alterations and modifications can be made without deviating from the scope disclosed in the claims, which are described later.

The invention claimed is:

1. An optical fiber connection device, comprising:
an optical fiber,
a cover member which covers the optical fiber in a circumferential direction;
a first connection member which includes an inlet and an outlet and in which the cover member is connected to the inlet,
a second connection member which includes an aperture connected to the outlet of the first connection member and to which light from the optical fiber is transmitted through the first connection member, and
a first light transmission protection part which protects a tip of the optical fiber in the first connection member;
wherein an tip of the cover member is located in a sealed apace of the first connection member formed between the first light transmission protection part and the cover member;
wherein a surface of the second connection member is made of metal;
wherein two first contacts are arranged on an outer circumferential surface of the cover member;
wherein first signal lines extended from each of the two first contacts are connected to a controller or a laser oscillator;
wherein two second contacts are provided on an inner circumferential surface of the first connection member in positions corresponding to the two first contacts;
wherein second signal lines extended from each of the two second contacts terminate at a distal surface of the first connection member; and
wherein, if the first connection member and the second connection member are connected with each other, the two first signal lines and the two second signal lines are electrically connected through the first contacts, the second contacts and the surface of the second connection member, so that a state of connection between the cover member and the first connection member and a state of connection between the first connection member and the second connection member are detected.

2. The optical fiber connection device according to claim 1, further comprising a second light transmission protection part which protects the aperture of the second connection member.

3. The optical fiber connection device according to claim 1, comprising a fixation member which affixes the outlet of the first connection member and the second connection member.

4. The optical fiber connection device according to claim 1, comprising a seal member which is arranged between the first connection member and the second connection member.

5. The optical fiber connection device according to claim 1, comprising a notification part which issues a notification regarding a state of connection between the first connection member and the second connection member.

6. The optical fiber connection device according to claim 2, comprising a contamination degree detection part which detects a degree of contamination of a space between the first light transmission protection part and the second light transmission protection part.

7. The optical fiber connection device according to claim 1, comprising an openable lid which is provided on at least one of the outlet of the first connection member and the aperture of the second connection member.

* * * * *